(12) United States Patent
Tanaka et al.

(10) Patent No.: US 8,920,278 B2
(45) Date of Patent: Dec. 30, 2014

(54) GEAR TRANSMISSION AND PHOTOVOLTAIC POWER-GENERATING APPARATUS USING THE GEAR TRANSMISSION

(75) Inventors: Satoshi Tanaka, Tsu (JP); Shigeki Asano, Tsu (JP)

(73) Assignee: Nabtesco Corporation, Tokyo (JP)

( * ) Notice: Subject to any disclaimer, the term of this patent is extended or adjusted under 35 U.S.C. 154(b) by 1002 days.

(21) Appl. No.: 13/057,429

(22) PCT Filed: Aug. 6, 2009

(86) PCT No.: PCT/JP2009/063926
§ 371 (c)(1),
(2), (4) Date: Feb. 3, 2011

(87) PCT Pub. No.: WO2010/021246
PCT Pub. Date: Feb. 25, 2010

(65) Prior Publication Data
US 2011/0132433 A1    Jun. 9, 2011

(30) Foreign Application Priority Data

Aug. 21, 2008 (JP) ................................ 2008-213065
Sep. 8, 2008 (JP) ................................ 2008-229898

(51) Int. Cl.
*F16H 1/32* (2006.01)
*F24J 2/54* (2006.01)

(52) U.S. Cl.
CPC . *F24J 2/542* (2013.01); *F16H 1/32* (2013.01); *F16H 2001/323* (2013.01); *F24J 2002/5462* (2013.01); *F24J 2002/5482* (2013.01); *Y02E 10/47* (2013.01)

USPC ............ 475/162; 475/149; 475/207; 475/343

(58) Field of Classification Search
USPC .................................. 475/162, 149, 207, 343
See application file for complete search history.

(56) References Cited

U.S. PATENT DOCUMENTS 4,383,520 A * 5/1983 Huebl et al. .................... 74/416
4,574,659 A   3/1986 Arndt
(Continued)

FOREIGN PATENT DOCUMENTS

EP  1 854 531 A1  11/2007
JP  3068561 U  2/2000
(Continued)

OTHER PUBLICATIONS

Communication from EPO dated Aug. 16, 2011 for counterpart EP application No. 09808182, including European Search Opinion, Supplementary European Search Report and Claims Examined by the EPO.

(Continued)

*Primary Examiner* — Derek D Knight
(74) *Attorney, Agent, or Firm* — J-Tek Law PLLC; Jeffrey D. Tekanic; Scott T. Wakeman

(57) ABSTRACT

A gear transmission comprises a crankshaft that eccentrically rotates one of an internal gear and an external gear. A first gear is attached to one end of the crankshaft. A ring gear having internal teeth meshes with the first gear. An intermediate gear meshes with external teeth of the ring gear. A second gear is attached to one end of an output shaft of a motor and meshes with the intermediate gear. The motor and the crankshaft are positioned, relative to the intermediate gear, on the same side in the axial direction of the gear transmission.

19 Claims, 11 Drawing Sheets

(56) References Cited

U.S. PATENT DOCUMENTS

| | | | |
|---|---|---|---|
| 5,080,635 A | 1/1992 | Martinez et al. | |
| 6,508,737 B2* | 1/2003 | Fujimoto | 475/178 |
| 7,070,533 B2* | 7/2006 | Tsurumi et al. | 475/162 |
| 2009/0010094 A1* | 1/2009 | Uemura | 366/132 |
| 2009/0258748 A1 | 10/2009 | Nakamura | |
| 2009/0325753 A1 | 12/2009 | Hirata | |

FOREIGN PATENT DOCUMENTS

| | | |
|---|---|---|
| JP | 2002106650 A | 4/2002 |
| JP | 2005142373 A | 6/2005 |
| JP | 2005315343 A | 11/2005 |
| JP | 2007-207801 A | 8/2007 |
| JP | 2007298101 A | 11/2007 |
| JP | 2008014500 A | 1/2008 |
| JP | 2008-192794 A | 8/2008 |
| WO | 2007/018181 A1 | 2/2007 |
| WO | 2008/026571 A1 | 3/2008 |

OTHER PUBLICATIONS

Written Opinion for parent application No. PCT/JP2009/063926.
Office Action mailed Dec. 26, 2012 from Chinese Patent Office for counterpart Chinese patent application No. 200980132680, including English translation of prior art rejection.
Office Action mailed Feb. 12, 2013 from Japanese Patent Office for priority Japanese patent application No. 2008-229898, including English translation thereof.
Communication mailed Apr. 25, 2012 from European Patent Office for sister European patent application No. 09 808 182.1-2421.
International Search Report for parent application No. PCT/JP2009/063926.

* cited by examiner

GEAR TRANSMISSION AND PHOTOVOLTAIC POWER-GENERATING APPARATUS USING THE GEAR TRANSMISSION

CROSS-REFERENCE

This application is the US national stage of International Patent Application No. PCT/JP2009/063926 filed on Aug. 6, 2009, which claims priority to Japanese Patent Application No. 2008-213065, filed on Aug. 21, 2008, and to Japanese Patent Application No. 2008-229898, filed on Sep. 8, 2008, the contents of both of which are hereby incorporated by reference into the present specification.

TECHNICAL FIELD This application relates to a gear transmission and to a photovoltaic power-generating apparatus using the gear transmission.

BACKGROUND ART

An eccentric oscillating-type gear transmission is disclosed in Japanese Patent Publication No. 2002-106650 (Patent Document 1). This gear transmission comprises an internal gear and an eccentrically-rotating external gear meshing with the internal gear. The external gear is supported on a carrier so that it can eccentrically rotate. The carrier is rotatably supported by the internal gear. The axis of the carrier is coaxial with the axis of the internal gear. A crankshaft is rotatably supported on the carrier so as to be parallel to the axis of the carrier. An eccentric body is formed on the crankshaft and the eccentric body is engaged with the external gear. When a motor rotates the crankshaft, the external gear rotates eccentrically. The number of teeth of the internal gear and the number of teeth of the external gear differ. Consequently, when the external gear rotates eccentrically, the carrier rotates, together with the external gear, relative to the internal gear.

The gear transmission of Patent Document 1 further comprises a gear 21, an input gear 17 and a gear 11b. The gear 21 is attached to one end of the crankshaft. The input gear 17 meshes with the gear 21. The gear 11b meshes with the input gear 17. The gear 11b is attached to an output shaft of a motor. Torque from the motor is transmitted to the crankshaft via the gear 11b, the input gear 17 and the gear 21.

SUMMARY OF THE INVENTION

In the gear transmission of Patent Document 1, the motor is located on one side of the intermediate gear in the axial direction and the crankshaft is located on the other side of the intermediate gear. Therefore, the carrier and the motor are located on the respective sides of the intermediate gear in the axial direction. Consequently, the overall length of the device including the gear transmission and the motor is lengthened. The present specification teaches techniques for shortening the overall length of the device that includes the gear transmission and the motor. Further, the present specification also teaches a photovoltaic power-generating apparatus that uses this gear transmission.

A gear transmission taught in the present specification comprises a first gear, a second gear, a ring gear and an intermediate gear. The first gear is attached at one end of a crankshaft. The ring gear has internal teeth and external teeth; the internal teeth mesh with the first gear. The intermediate gear meshes with the external teeth of the ring gear. The second gear is attached at one end of an output shaft of a motor and meshes with the intermediate gear. In addition, the motor and the crankshaft are positioned on the same side, relative to the intermediate gear, in the axial direction of the intermediate gear. When this gear transmission is viewed from a direction perpendicular to the axis of the gear transmission, the motor is not offset from the crankshaft on the outer side in the axial direction of the crankshaft. In other words, when viewed from the direction perpendicular to the axis of the gear transmission, the motor overlaps with the crankshaft. Consequently, this gear transmission can shorten the overall length of the device that includes the motor and the gear transmission.

The gear transmission taught in the present specification further comprises an internal gear and an external gear meshing with the internal gear. One of the internal gear and the external gear rotates eccentrically relative to the other. More specifically, a carrier may be rotatably supported in a coaxial manner on the other of the internal gear and the external gear. Here, "the other of the internal gear and the external gear" means the gear that does not rotate eccentrically. Further, the crankshaft is rotatably supported on the carrier. When viewed from a direction perpendicular to the axis of the carrier, the motor overlaps with the carrier. The above-mentioned first gear is attached to the crankshaft at the outer side of the carrier in the direction alongside the axis of the carrier. The crankshaft eccentrically rotates one of the internal gear and the external gear. Torque from the motor is transmitted to the crankshaft via the second gear, the intermediate gear and the first gear. When the crankshaft rotates, the carrier rotates in accordance with the difference in the number of teeth of the external gear and internal gear. This type of gear transmission is called an eccentric oscillating-type gear transmission. Furthermore, in case the gear transmission has a plurality of crankshafts, the first gear should be attached to at least one crankshaft.

As was described above, the crankshaft eccentrically rotates the internal gear or the external gear. In case the external gear rotates eccentrically, the axis of the internal gear that rotates relative to the external gear corresponds to the "axis of the gear transmission". In case the internal gear rotates eccentrically, the axis of the external gear corresponds to the "axis of the gear transmission". In either case, the axis of the carrier is identical to the "axis of the gear transmission".

The shaft supporting the intermediate gear may be supported in a cantilevered manner on an opposite side of the motor relative to the intermediate gear. In this type of structure, the shaft is not required to be positioned between the motor and the carrier. Consequently, in the gear transmission having this type of structure, the offset distance of the motor and carrier in the radial direction can be shortened. The outer diameter of the device that includes the motor and the gear transmission becomes compact.

The feature of the device, which includes the gear transmission and the motor, that its overall length is shorter is particularly effective in case driven members are attached to both sides of the gear transmission in the axial direction. For example, the gear transmission may be utilized as a drive unit of a photovoltaic power-generating apparatus that rotates two panels positioned on opposite sides of a supporting column. The gear transmission may be attached to the supporting column such that an output shaft of the gear transmission extends in a horizontal direction. In case the two panels are attached to the output shaft of the gear transmission, if the distance between the two panels is short, the bending moment applied to the gear transmission can be minimized. Further, when the gear transmission taught in the present specification is utilized, since the distance between the two panels is shortened, the size of the photovoltaic power-generating apparatus can be reduced. The carrier may be a part of the output shaft of the gear transmission. In this case, the carrier of the gear transmission may further function as a main shaft of the photovoltaic power-generating apparatus. Furthermore, the "main shaft" of the photovoltaic power-generating apparatus means a shaft extending in a direction intersecting with the supporting column (e.g., the horizontal direction), and to which the pair of panels are attached.

Furthermore, in addition to a panel equipped with a plurality of solar cells on its surface, "panel" in the present specification may also include a panel equipped with a reflector on its surface. This panel tracks the movement of the sun. Furthermore, in addition to a panel that rotates to maintain its position perpendicular to the sun, "tracking the movement of the sun" may further include rotation of the panel such that light reflected from the panel is focused at one point. Consequently, in addition to an apparatus that generates power using solar cells attached to the panel, the "photovoltaic power-generating apparatus" of the present specification may further include an apparatus that generates power using light reflected from the panel (reflector).

In the photovoltaic power-generating apparatus utilizing the gear transmission, the bearing of the main shaft of the photovoltaic power-generating apparatus may be disposed within the same case as the gears in the gear transmission. Lubricant is required to be supplied to the bearing and gears. Consequently, in the photovoltaic power-generating apparatus utilizing the gear transmission, the amount of lubricant is only required to fill the space in which the bearing of the main shaft of the photovoltaic power-generating apparatus is located and to immerse the uppermost gear of all the gears in the gear transmission.

In the photovoltaic power-generating apparatus utilizing the gear transmission, the second gear may be positioned lower than the axis of the carrier in order to minimize the amount of lubricant used. Furthermore, the second gear is not required to be positioned vertically below the axis of the carrier, but may be positioned lower than a horizontal plane that includes the axis of the carrier. As was described above, the bearing that supports the carrier (or the main shaft of the photovoltaic power-generating apparatus) and the second gear attached to the output shaft of the motor are housed within the case of the gear transmission. The lubricant is required to be supplied to the second gear and to the bearing that supports the carrier. This lubricant is enclosed within the case of the gear transmission. In this photovoltaic power-generating apparatus, the amount of lubricant may be sufficient to immerse only a lower portion of the bearing that supports the carrier. Since the second gear is positioned lower than the axis of the carrier, the gears for transmitting torque from the second gear to the carrier are necessarily positioned lower than the axis of the carrier.

In case the second gear is positioned vertically below the output shaft of the gear transmission, the axis of the supporting column of the photovoltaic power-generating apparatus and the axis of the gear transmission may be in a skewed positional relationship. The second gear can be positioned on the outer side in the radial direction of the supporting column. A space between the output shaft of the gear transmission and the supporting column is therefore not required for disposing the second gear. The distance between the gear transmission and the supporting column can be shortened.

The techniques taught in the present specification are suitable for a large-scale photovoltaic power-generating apparatus. In the present specification, "large-scale photovoltaic power-generating apparatus" means that the diameter of the output shaft of the gear transmission (the main shaft to which the panels are attached) is greater than the diameter of the second gear. In this type of photovoltaic power-generating apparatus, the second gear, which is positioned lower than a horizontal plane that includes the axis of the output shaft, is covered by lubricant. On the other hand, only a small portion of the bearing supporting the large diameter output shaft is required to be immersed in the lubricant. In this type of photovoltaic power-generating apparatus, the necessary amount of the lubricant remains relatively small despite having the large diameter bearing (the bearing supporting the output shaft).

As was described above, the gear transmission utilized in this photovoltaic power-generating apparatus may be an eccentric oscillating-type. In this gear transmission, one of the internal gear and the external gear rotates eccentrically relative to the other. This type of gear transmission may have a plurality of crankshafts disposed in the circumferential direction of the carrier. As the carrier rotates, each of the crankshafts is immersed in the lubricant when it passes below the axis of the carrier (i.e. the axis of the output shaft).

According to the techniques taught in the present specification, a photovoltaic power-generating apparatus can be realized that enables the amount of lubricant used to be economized. On the other hand, this photovoltaic power-generating apparatus may have a poorer cooling performance than the case in which a large amount of lubricant is used. Further, the photovoltaic power-generating apparatus is exposed to direct sunlight for a long time. Consequently, it is possible that the temperature of the lubricant enclosed within the case will rise due to the sunlight. When the technical feature is utilized, in which the second gear is positioned lower than the axis of the output shaft in a more effective manner, a photovoltaic power-generating apparatus can be realized that can suppress the lubricant temperature increase caused by heat from the sunlight. That is, the second gear may be positioned, relative to the output shaft of the gear transmission, on the opposite side from the position of the sun when the sun is at its upper culmination. Further, the motor also may be positioned, relative to the output shaft, on the opposite side from the position of the sun when the sun is at its upper culmination. Alternatively, the second gear may be positioned vertically below the output shaft. Further, the motor also may be positioned vertically below the output shaft. In either case, since the motor, or the part of the case in which the lubricant is enclosed, is positioned in the shadow of the output shaft of the gear transmission, the period of time that it receives direct sunlight is shortened. Consequently, an increase in the temperature of the lubricant or the motor, caused by the sunlight, is suppressed. Further, a part of the heat from the direct sunlight received by the output shaft of the gear transmission is radiated from the output shaft or the solar cell panels attached to the output shaft. This also contributes to suppressing the increase in temperature of the lubricant or the motor.

The gear transmission taught in the present specification can, when connected with the motor, shorten the overall length of the device that includes the gear transmission and the motor. Further, a compact photovoltaic power-generating apparatus can be realized utilizing that gear transmission.

DESCRIPTION OF THE EMBODIMENTS

Before describing the embodiments, several technical features of the embodiments will be noted. Furthermore, the principle technical features are included in the descriptions of the embodiments.

(Feature 1) An external gear rotates eccentrically and rotates relative to an internal gear. An eccentric body is formed on a crankshaft and the eccentric body engages with the external gear. When the crankshaft rotates, the eccentric body rotates eccentrically and the external gear rotates eccentrically.

(Feature 2) An axis of a motor is parallel to an axis of the gear transmission.

(Feature 3) The gear transmission comprises the internal gear, the external gear that rotates eccentrically about the axis of the internal gear and rotates relative to the internal gear, and a carrier that supports the external gear. The carrier supports the external gear while allowing the eccentric rotation of the external gear. The carrier follows the rotation of the external gear and rotates relative to the internal gear. The carrier comprises a portion of an output shaft of the gear transmission.

(Feature 4) In a photovoltaic power-generating apparatus 200, the axis of a supporting column and the axis of the output shaft of the gear transmission are in a skew position. The motor is positioned on the outer side in the radial direction of the supporting column.

(First Embodiment)

Figure 1:
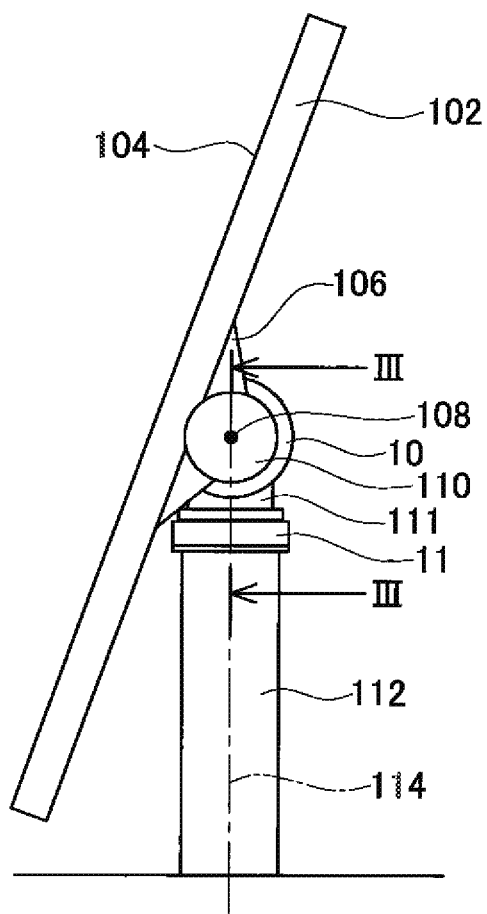
FIG. 1 shows a side view of a photovoltaic power-generating apparatus of a first embodiment.
Figure 2:
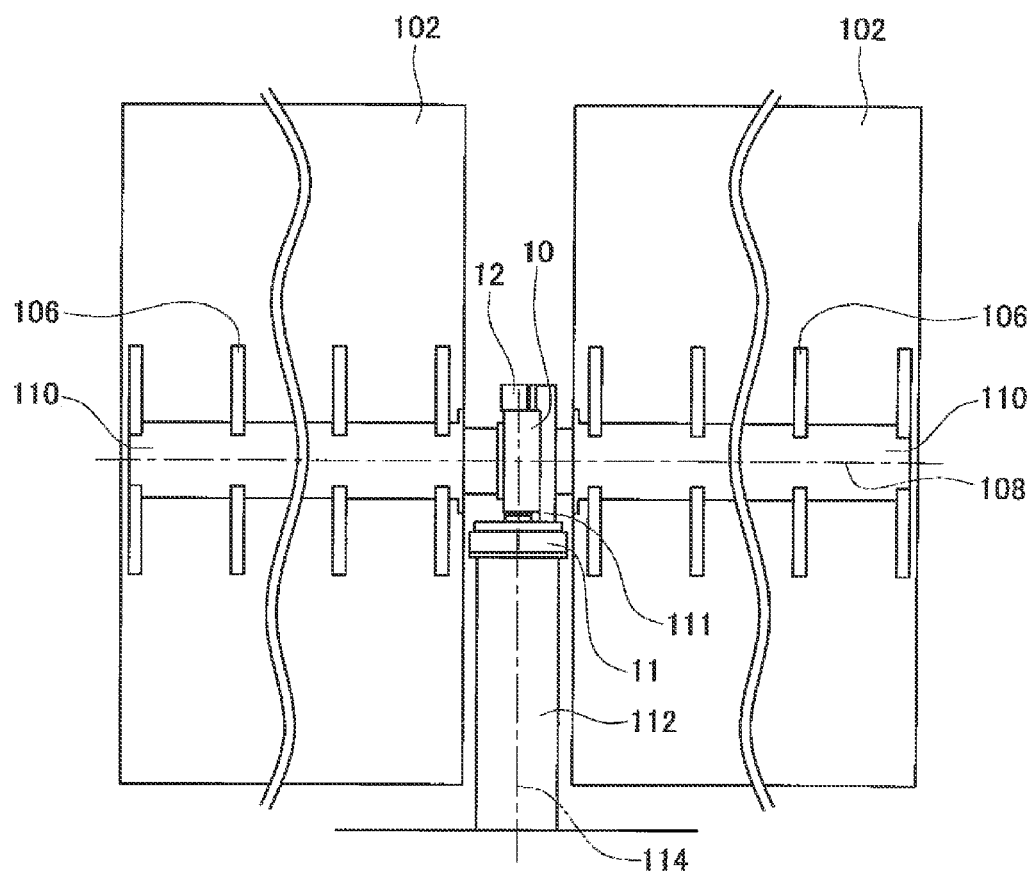
FIG. 2 shows a rear view of the photovoltaic power-generating apparatus of the first embodiment.
Figure 3:
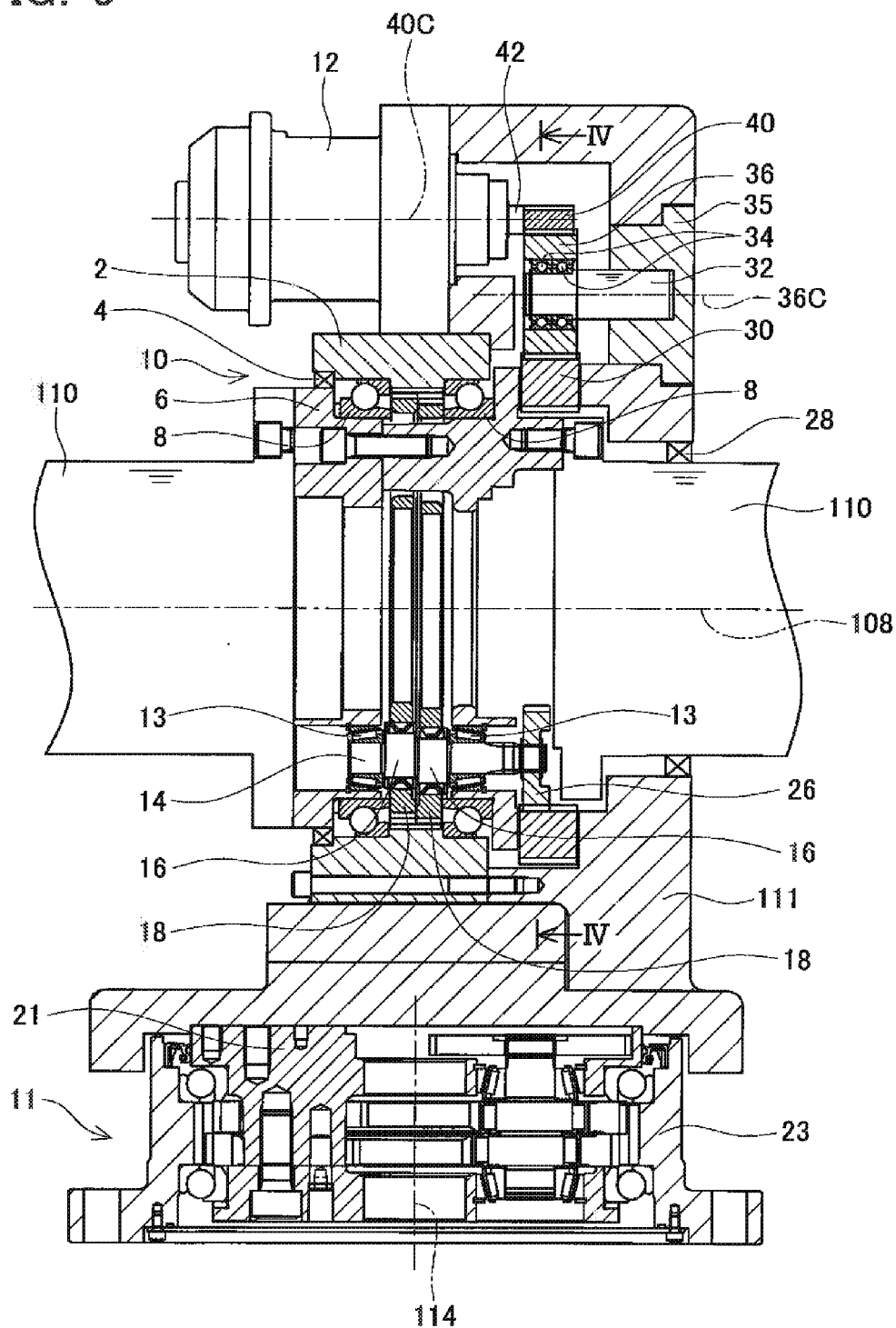
FIG. 3 shows a cross-sectional view along line III-III of FIG. 1.

FIG. 1 and FIG. 2 show a photovoltaic power-generating apparatus 100 utilizing a gear transmission 10. FIG. 1 shows a side view of the photovoltaic power-generating apparatus 100 and FIG. 2 shows a rear view of the photovoltaic power-generating apparatus 100. A cross-sectional view along line III-III of FIG. 1 is shown in FIG. 3. Further, the middle portion of each panel 102 is omitted in FIG. 2.

First, the photovoltaic power-generating apparatus 100 will be described. The photovoltaic power-generating apparatus 100 comprises a supporting column 112 and two panels 102. The two panels 102 are positioned on opposite sides of the supporting column 112 and are attached to a shaft 110 by support members 106. The two shafts 110 constitute the main shaft of the photovoltaic power-generating apparatus 100. The gear transmission 10 is attached to the supporting column 112 such that the output shaft of the gear transmission 10 extends in a horizontal direction. The two shafts 110 are attached to an output member (the output shaft of the gear transmission 10) of the gear transmission 10 on the opposite sides thereof in the direction of the axis 108 of the gear transmission 10. The two shafts 110 extend horizontally from opposite sides of the output shaft of the gear transmission 10. The gear transmission 10 rotates the two panels 102 about the axis 108. A pivoting gear transmission 11 is located between the supporting column 112 and the gear transmission 10. The gear transmission 10 is attached via a connecting member 111 to an output member of the pivoting gear transmission 11. The pivoting gear transmission 11 rotates the gear transmission 10 and the two panels 102 about an axis 114. The panels 102 rotate about two axes: the axis 108 that extends in the horizontal direction and the axis 114 that extends in the vertical direction. The axis 108 represents the axis of the gear transmission 10 and the axis 114 represents the axis of the pivoting gear transmission 11. The axis 114 also corresponds to the axis of the supporting column 112. The axis 108 and the axis 114 intersect. In the photovoltaic power-generating apparatus 100 of the present embodiment, the axis 108 and the axis 114 are perpendicular.

As was described above, the two panels 102 rotate relative to the supporting column 112 about the two axes: the axis 108 and the axis 114. Consequently, in this photovoltaic power-generating apparatus 100, the surfaces 104 of the panels 102 can follow the movement of the sun (track the movement of the sun) so as to always face the direction of the sun. A plurality of solar cells (not shown) is located on the surfaces 104 of the panels 102.

Reference number 12 of FIG. 2 indicates a motor for driving the gear transmission 10. The motor 12 is disposed at a position offset from the gear transmission 10 in the direction of the axis 114. In other words, when the motor 12 is viewed along the direction of the axis 114, the motor 12 overlaps with the gear transmission 10. Therefore, the motor 12 is not disposed at a position offset from the gear transmission 10 in the direction of the axis 108. If the motor 12 were to be disposed at a position offset from the gear transmission 10 in the direction of the axis 108, it would be necessary to provide a space between the two panels 102 that equals the length of the motor 12 plus the length of the gear transmission 10. If the distance between the two panels 102 becomes large, a large bending moment will be exerted on the gear transmission 10 by the weight of the panels 102. Since the photovoltaic power-generating apparatus 100 of the present embodiment can shorten the distance between the two panels 102, the bending moment exerted on the gear transmission 10 can be minimized. Further, by shortening the distance between the two panels, the size of the photovoltaic power-generating apparatus 100 can be reduced.

Next, the gear transmission 10 will be described. FIG. 3 shows the cross-sectional view along line III-III of FIG. 1. In FIG. 3, the supporting column 112 is not shown. The gear transmission 10 is attached to an output member 21 of the pivoting gear transmission 11 via the connecting member 111. The output member 21 is an output shaft that outputs the rotational torque of the pivoting gear transmission 11 and corresponds to a carrier of the pivoting gear transmission 11. A case 23 of the pivoting gear transmission 11 is attached to the supporting column 112 (not shown). Consequently, the gear transmission 10 can rotate about the axis 114 of the supporting column 112. Further, as long as the pivoting gear transmission 11 is of a type that can rotate the connecting member 111, any type of gear transmission may be used. In the present embodiment, the basic structure of the pivoting gear transmission 11 is identical to the gear transmission 10.

Consequently, the gear transmission 10 will be described in detail, while a detailed description of the pivoting gear transmission 11 will be omitted.

The gear transmission 10 comprises an external gear 18 and an internal gear 2. The external gear 18 meshes with the internal gear 2. The external gear 18 rotates eccentrically following the rotation of a crankshaft 14 that will be described below. Further, the internal gear 2 is formed in a portion of an inner circumferential surface of the case of the gear transmission 10. In other words, the internal gear 2 also functions as the case of the gear transmission 10. The number of teeth of the external gear 18 and the number of teeth of the internal gear 2 differ. Consequently, when the external gear 18 rotates eccentrically, the external gear 18 rotates relative to the internal gear 2 in accordance with the difference in the number of teeth of the external gear 18 and internal gear 2. The external gear 18 is supported on a carrier 6 so as to be capable of eccentric rotation. Further, the carrier 6 is rotatably supported on the internal gear 2 by a pair of angular ball bearings 8. When the external gear 18 rotates eccentrically, the external gear 18 rotates, together with the carrier 6, relative to the internal gear 2. The carrier 6 can also be called the output member or output shaft of the gear transmission 10. The two shafts 110 are affixed to the opposite ends of the carrier 6. Consequently, the carrier 6 and the shafts 110 can also be called the output shaft of the gear transmission 10. Further, the carrier 6 can also be called a part of the shafts 110. Further, the pair of angular ball bearings 8 can also be called the main shaft bearings 8 that support the shafts 110.

When the crankshaft 14 rotates, the shafts 110 rotate together with the carrier 6. As was described above, the panels 102 are affixed to each of the shafts 110. The crankshaft 14 is supported on the carrier 6 by a pair of tapered roller bearings 13. An eccentric body 16 is formed on the crankshaft 14. The eccentric body 16 engages with the external gear 18. Consequently, the external gear 18 can also be said to be supported on the carrier 6 via the crankshaft 14. When the crankshaft 14 rotates, the eccentric body 16 rotates eccentrically and the external gear 18 rotates eccentrically. An input gear 26 is affixed to one end of the crankshaft 14. The input gear 26 is an example of a first gear. Furthermore, the gear transmission 10 has three crankshafts 14. The relationship of the three crankshafts 14 will be described below.

Figure 4:
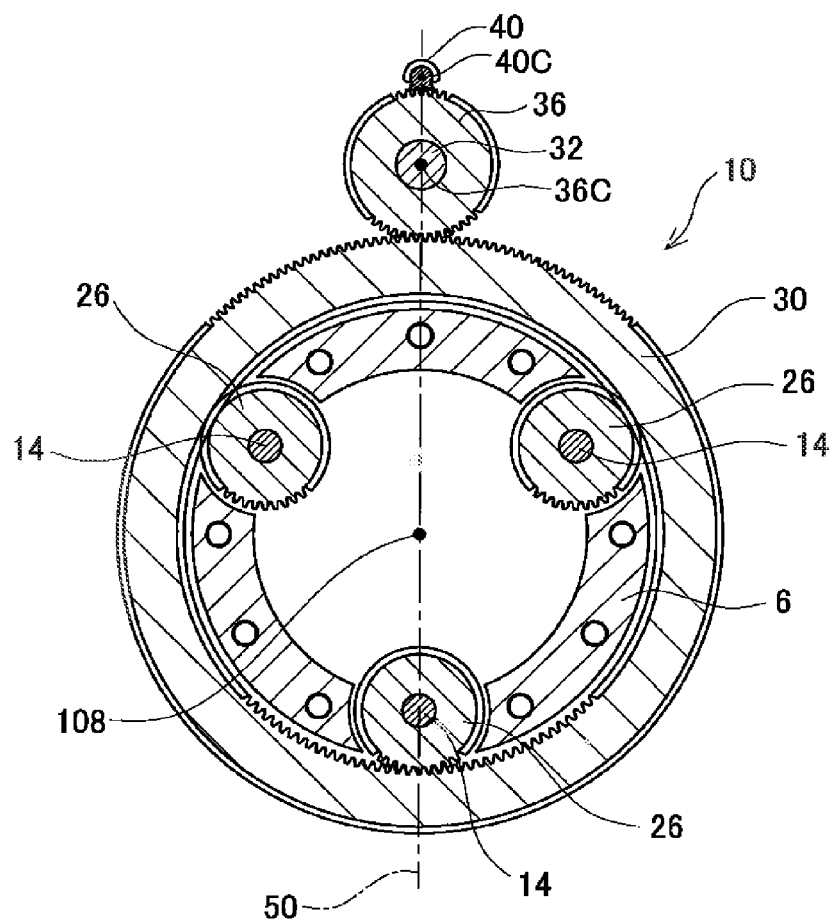
FIG. 4 shows a cross-sectional view along line IV-IV of FIG. 3.

FIG. 4 shows a cross-sectional view along line IV-IV of FIG. 3. As shown in FIG. 4, a ring gear 30 is positioned so as to surround the three input gears 26. Internal teeth are formed on the inner circumference of the ring gear 30 and external teeth are formed on the outer circumference. The input gears 26 attached to the crankshafts 14 mesh with the internal teeth of the ring gear 30. An intermediate gear 36 meshes with the external teeth of the ring gear 30. A motor gear 40 attached to an output shaft 42 of the motor 12 (see FIG. 3) meshes with the intermediate gear 36. In other words, the intermediate gear 36 is disposed between the ring gear 30 and the motor gear 40 and meshes with the motor gear 40 and the external teeth of the ring gear 30. Further, the motor gear 40 is an example of a second gear. The input gear 26, the ring gear 30, the intermediate gear 36 and the motor gear 40 are all spur gears. Further, illustrations of portions of the teeth of the input gear 26, the ring gear 30, the intermediate gear 36 and the motor gear 40 are omitted in FIG. 4.

As shown in FIG. 3, the motor 12 and the carrier 6 are disposed, relative to the intermediate gear 36, on one side in the direction of the axis 108. In other words, the motor 12 and the crankshaft 14 are disposed, relative to the intermediate gear 36, on the same side in the direction of the axis 108. Further, the crankshaft 14 and the output shaft 42 of the motor 12 can also be said to be extending, relative to the intermediate gear 36, on one side in the direction of the axis 108. Alternatively, when viewed from a direction perpendicular to the axis 108 of the gear transmission 10, each of the motor 12 and the carrier 6, the motor 12 and the crankshaft 14, and the crankshaft 14 and the output shaft 42 of the motor, can also be said to be overlapping. Consequently, the motor 12 is located on the outer side in the radial direction of the gear transmission 10 (the direction perpendicular to the axis 108). The axis 40C of the motor gear 40 is parallel to the axis 108 of the gear transmission 10. Consequently, the motor 12 is disposed parallel to the axis 108 of the gear transmission 10. Furthermore, the axis 36C of the intermediate gear 36 is also parallel to the axis 108 of the gear transmission.

By disposing the intermediate gear 36 between the ring gear 30 and the motor gear 40, it is possible to minimize the outer diameter of the ring gear 30 and/or the motor gear 40. If the outer diameter of the ring gear 30 and/or motor gear 40 increases, the size of the connecting member 111 increases in the radial direction of the gear transmission 10 (the direction perpendicular to the axis 108). In particular, if the outer diameter of the ring gear 30 is increased, the distance between the gear transmission 10 and the pivoting gear transmission 11 must be increased. In this case, a large moment load acts on the pivoting gear transmission 11.

Further, if the distance between the ring gear 30 and the output shaft 42 of the motor 12 were to be shortened, the intermediate gear 36 could be omitted. However, in that case, it would not be possible to dispose the motor 12 and the crankshaft 14, relative to the ring gear 30, on the same side in the direction of the axis 108. Therefore, it would be necessary to dispose the motor 12 at a position offset from the gear transmission 10 in the direction of the axis 108. When viewed along the radial direction of the gear transmission 10, the motor 12 and the gear transmission 10 would not overlap. Consequently, it would be necessary to maintain a distance between the two panels 102 (see FIG. 2) that is equal to the length of the motor 12 plus the length of the gear transmission 10.

If the carrier 6 were to be positioned, relative to the intermediate gear 36, on one side in the direction of the axis 108, and the motor 12 were to be positioned, relative to the intermediate gear 36, on the other side in the direction of the axis 108, the overall length of the gear transmission 10 having the motor 12 attached thereto would become longer in the direction of axis 108. By disposing the motor 12 on the outer side in the radial direction of the gear transmission 10, the overall length of the gear transmission having the motor attached thereto can be shortened in the direction of axis 108.

Other features of the gear transmission 10 will be described. The intermediate gear 36 is supported on one end of a shaft 32 by a deep groove ball bearing 34. The shaft 32 is press-fit into a shaft support 35 and the shaft support 35 is attached to the connecting member 111 on the opposite side from the motor 12. That is, the intermediate gear 36 is supported in a cantilevered manner. The gear transmission 10 is not required to maintain a space between the motor 12 and the carrier 6 for the purpose of disposing the shaft 32 and a bearing that supports the shaft 32. Consequently, the size of the gear transmission having the motor attached thereto can be made compact in the direction perpendicular to the axis 108 (the radial direction of the gear transmission 10). Moreover, the shaft support 35 can be attached to and removed from the connecting member 111. Consequently, the intermediate gear 36 can mesh with the motor gear 40 and the ring gear 30 on the opposite side of the motor 12. Thus, the work for assembling the gear transmission having the motor attached thereto becomes easier.

As shown in FIG. 3, the ring gear 30 is disposed between the carrier 6 and the connecting member 111. Only a small clearance exists between the ring gear 30 and the carrier 6 and between the ring gear 30 and the connecting member 111. It can also be said that the ring gear 30 almost touches on both sides of the carrier 6 and the connecting member 111. Consequently, the gear transmission 10 can prevent the ring gear 30 from moving along the axis 108 without the use of a bearing.

Further, as shown in FIG. 4, the gear transmission 10 comprises the three crankshafts 14. One input gear 26 is affixed to each crankshaft 14. In addition, all the input gears 26 mesh with the internal teeth of the ring gear 30. By using three input gears 26, the gear transmission 10 can prevent the ring gear 30 from moving in the radial direction without the use of a bearing. The gear transmission 10 can rotatably support the ring gear 30 in a prescribed location without the use of a bearing.

As shown in FIG. 3, the gears 26, 30, 36 and 40 are housed within the same enclosed space. The "enclosed space" here means a space enclosed by the shaft 110, the connecting member 111, the internal gear 2, the carrier 6, the motor 12 and the shaft support 35. Furthermore, the internal gear 2, the motor 12 and the shaft support 35 are attached to the connecting member 111. The carrier 6 is attached to the shaft 110. An oil seal 4 is disposed between the internal gear 2 and the carrier 6; an oil seal 28 is disposed between the shaft 110 and the connecting member 111. The enclosed space is formed by the oil seals 4, 28. This enclosed space can also be considered to be a space within the case of the gear transmission 10. Lubricant (oil) is enclosed within this enclosed space. The oil seals 4, 28 prevent the oil within the enclosed space of the gear transmission 10 from leaking to the outside.

Figure 5:
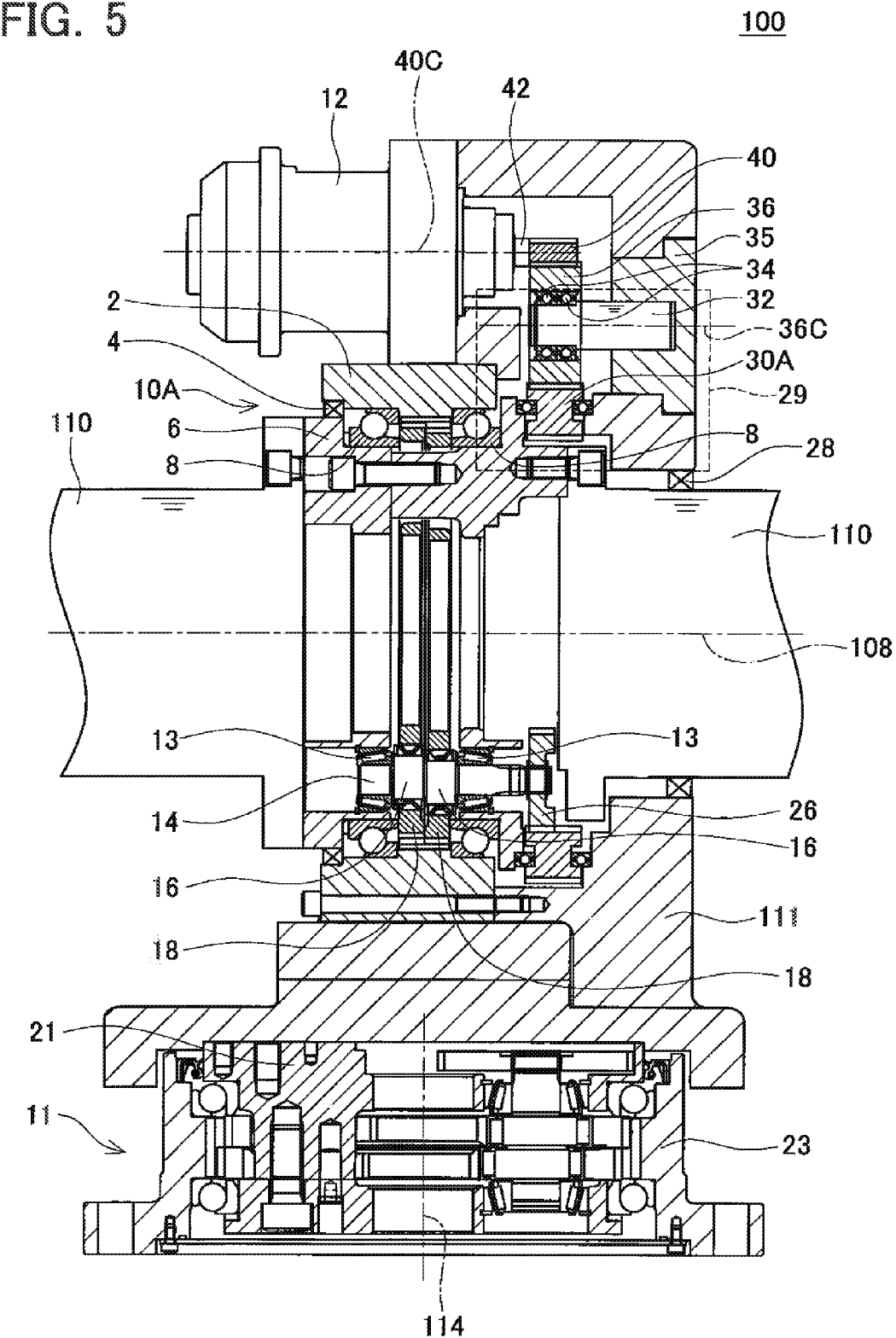
FIG. 5 shows a modified example of the gear transmission used in the photovoltaic power-generating apparatus of the first embodiment.

As was described above, in the gear transmission 10, the ring gear 30 is rotatably supported in the prescribed position without the use of a bearing. The ring gear may be supported by a bearing. In the photovoltaic power-generating apparatus 100 shown in FIG. 5, a gear transmission 10A is utilized instead of the gear transmission 10. In the gear transmission 10A, a ring gear 30A is supported on the connecting member 111 and the carrier 6 by bearings.

Figure 6:
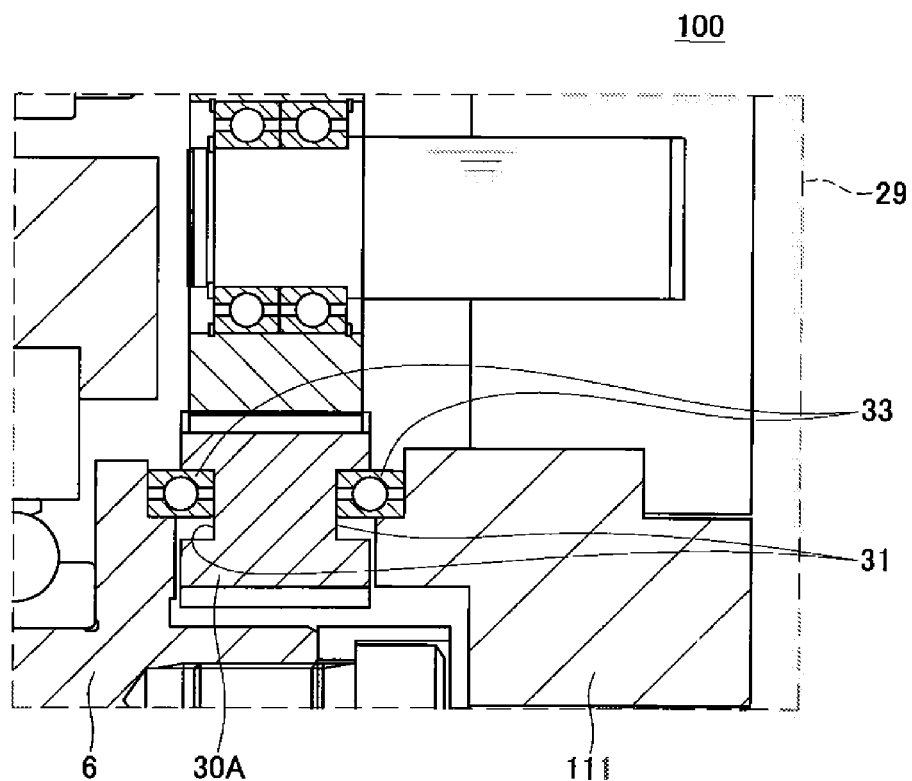
FIG. 6 shows an enlarged view of the section surrounded by broken line 29 of FIG. 5.

As shown in FIG. 6, a groove 31 is formed in each of the front and rear surfaces of the ring gear 30A. Two deep groove ball bearings 33 are respectively disposed within the grooves 31 and support the ring gear 30A so that it can rotate relative to the carrier 6 and the connecting member 111. By using the deep groove ball bearings 33, the ring gear 30A can be reliably prevented from moving in the radial direction; consequently, torque can be uniformly transmitted from the ring gear 30A to the three input gears 26 (see FIG. 4). Further, the ring gear 30A may be supported so that it can rotate relative to the internal gear 2 (the case of the gear transmission 10A) and the connecting member 111. Further, angular ball bearings, thrust bearings, etc., may be utilized instead of the deep groove ball bearings 33.

(Embodiment 2)

Figure 7:
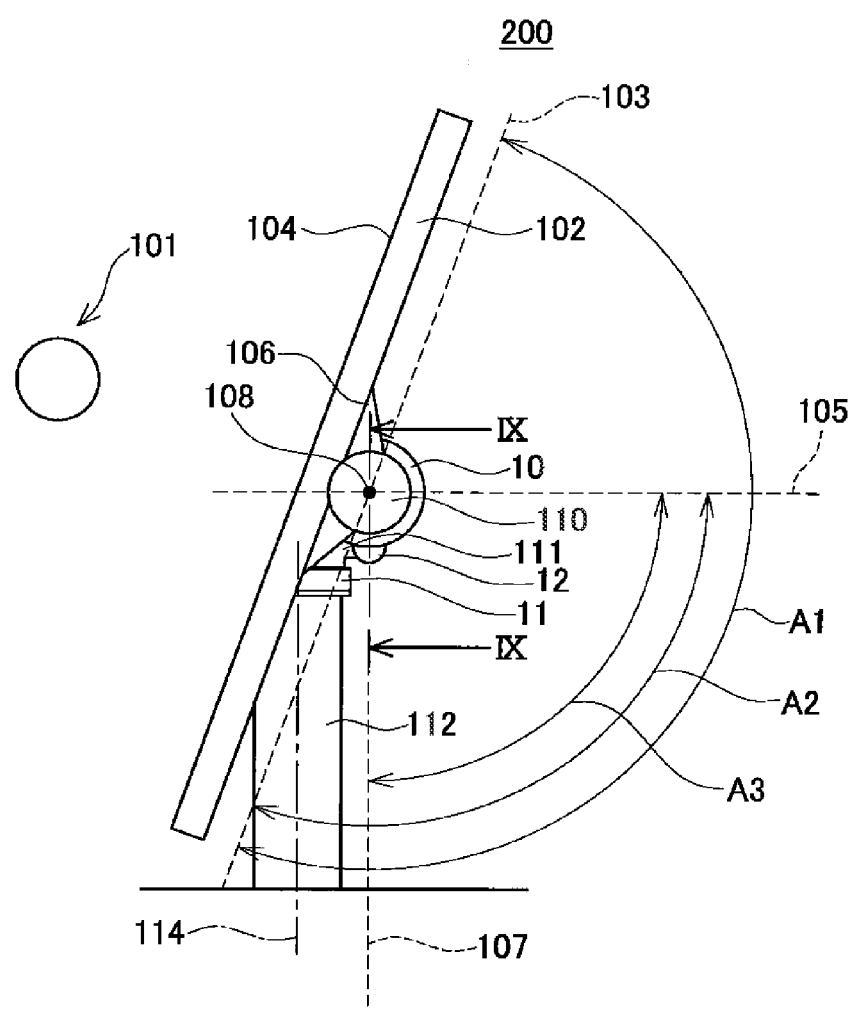
FIG. 7 shows a side view of a photovoltaic power-generating apparatus of a second embodiment.
Figure 8:
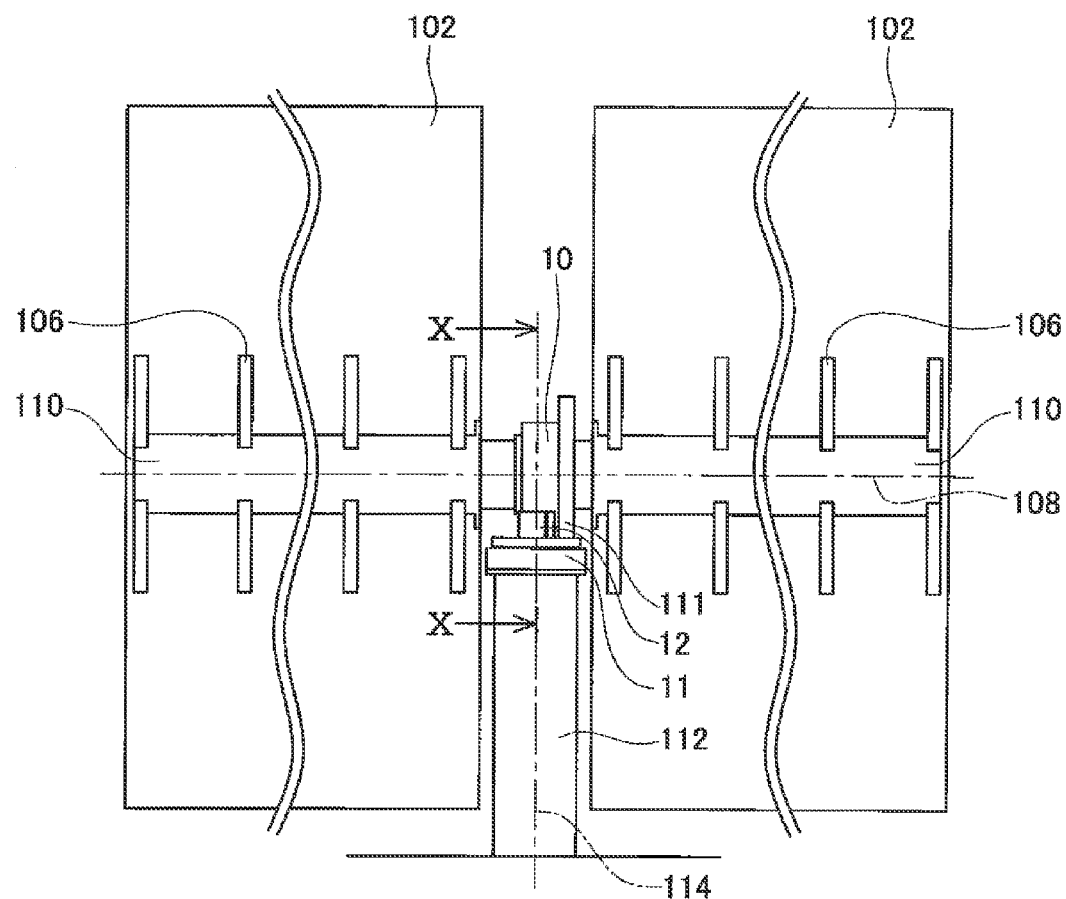
FIG. 8 shows a rear view of the photovoltaic power-generating apparatus of the second embodiment.
Figure 9:
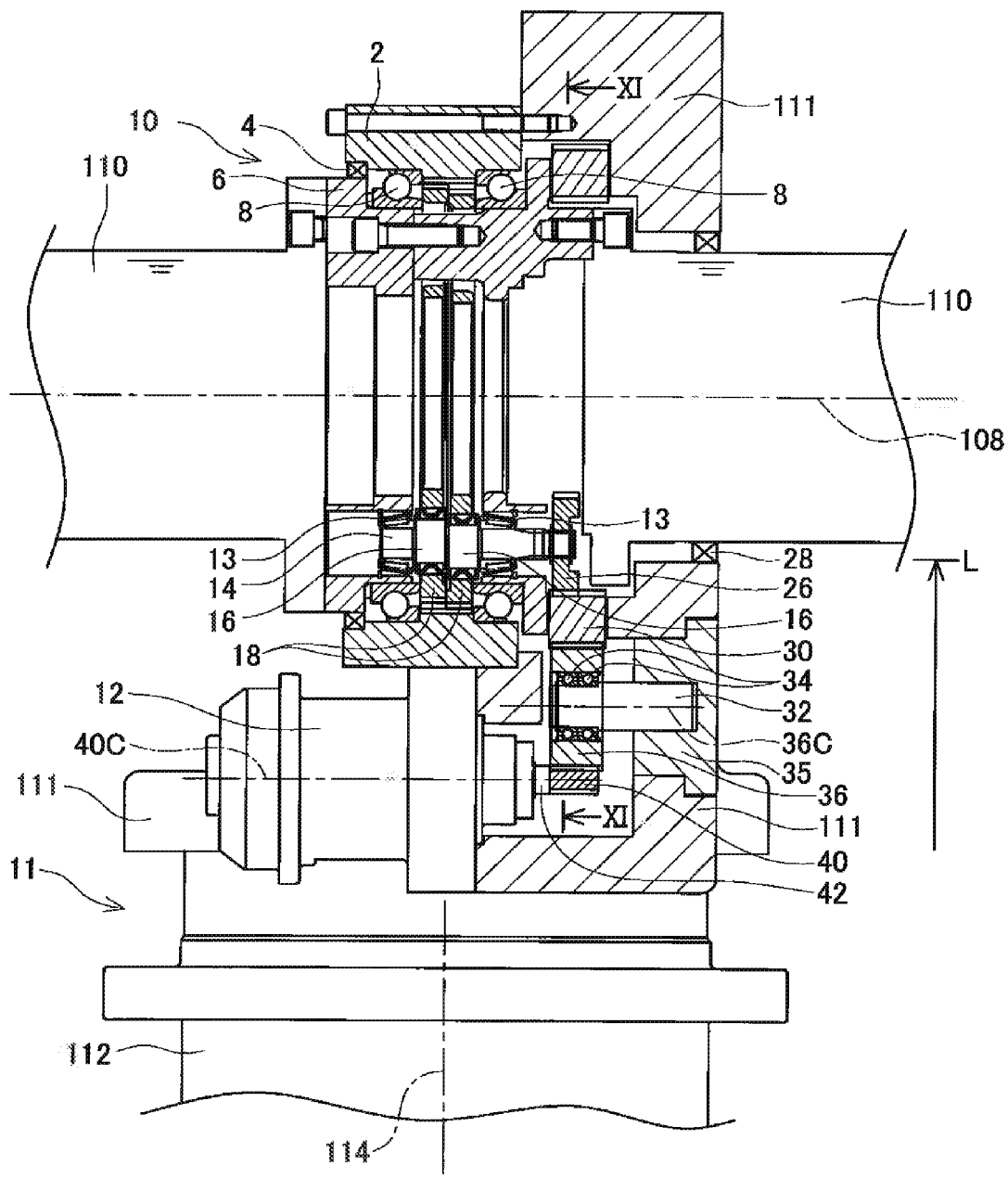
FIG. 9 shows a cross-sectional view along line IX-IX of FIG. 7.
Figure 10:
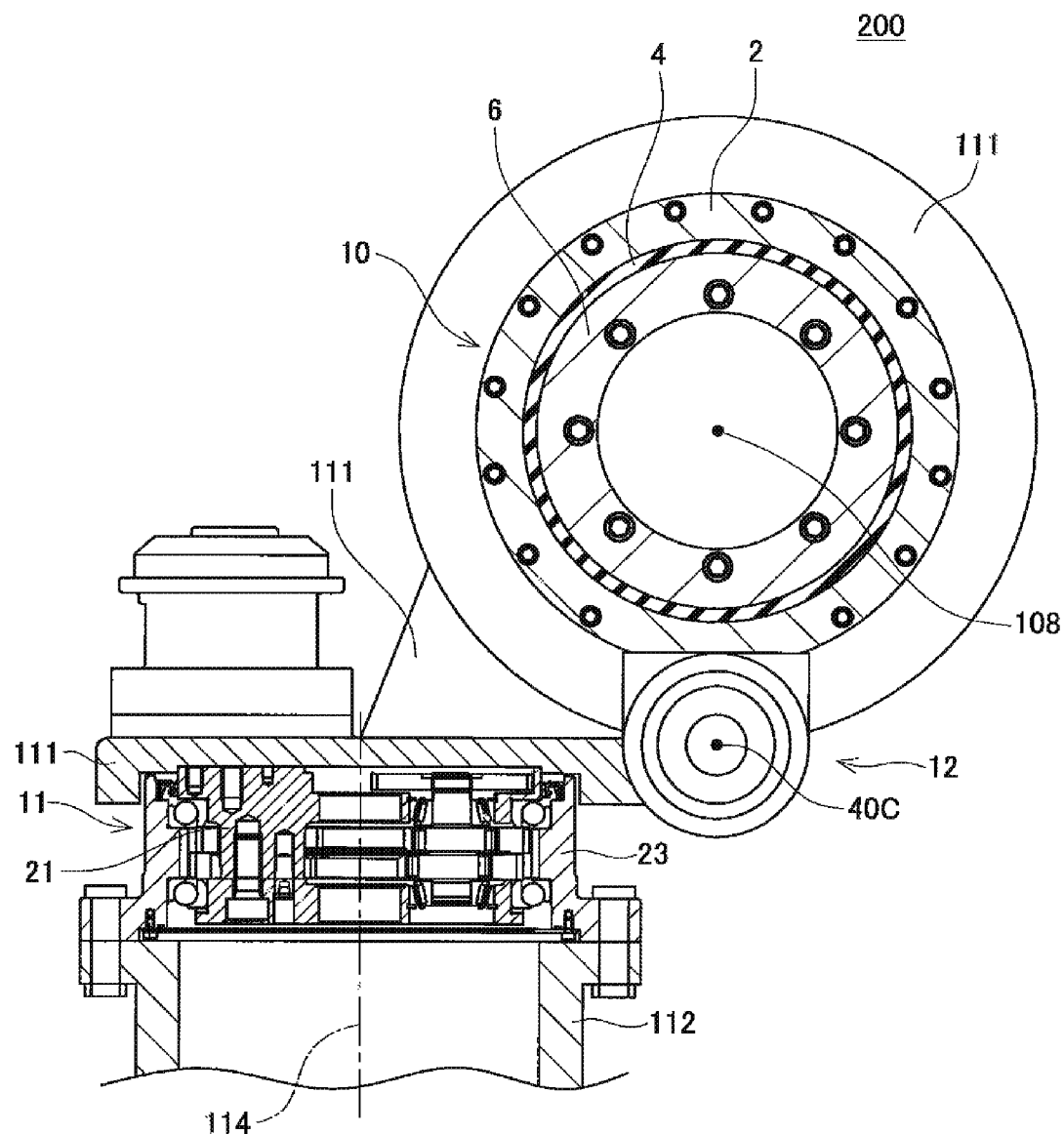
FIG. 10 shows a cross-sectional view along line X-X of FIG. 8.

FIG. 7 and FIG. 8 show a photovoltaic power-generating apparatus 200 comprising the gear transmission 10. FIG. 7 shows a side view of the photovoltaic power-generating apparatus 200 and FIG. 8 shows a rear view of the photovoltaic power-generating apparatus 200. FIG. 9 shows a cross-sectional view along line IX-IX of FIG. 7. FIG. 10 shows a cross-sectional view along line X-X of FIG. 8. The photovoltaic power-generating apparatus 200 will be described below. The photovoltaic power-generating apparatus 200 is a modified example of the photovoltaic power-generating apparatus 100; parts that are the same as those of the photovoltaic power-generating apparatus 100 have the same reference numbers appended thereto and an explanation thereof is omitted. Moreover, the photovoltaic power-generating apparatus 200 may also comprise the gear transmission 10A instead of the gear transmission 10.

As shown in FIGS. 7, 8, the motor 12 is positioned vertically below the axis 108 of the shaft 110 and is positioned on the outer side in the radial direction of the supporting column 112 (the direction perpendicular to the axis 114). Consequently, in the photovoltaic power-generating apparatus 200, the motor 12 is disposed vertically below the axis 108 of the shaft 110. In other words, the motor gear 40 is disposed vertically below the axis 108 of the shaft 110.

As shown in FIG. 9, the gears 26, 30, 36, 40 are housed within the same enclosed space. Angular ball bearings 8 are also housed within this enclosed space. Letter L of FIG. 9 indicates the height of a liquid level of the lubricant enclosed within the enclosed space. The lubricant fills only one portion of the enclosed space and does not fill one portion of the enclosed space. The motor gear 40 and the intermediate gear 36 are immersed in the lubricant. As was described above, the lubricant is filled only up to the height indicated by letter L. Consequently, only a portion of the internal gear 2, the external gear 18, the ring gear 30, the input gear 26, the angular ball bearings 8 and the tapered roller bearings 13 in the circumferential direction is immersed in the lubricant. In the photovoltaic power-generating apparatus 200, the gear transmission 10 does not require an amount of the lubricant sufficient to fill the entire space within the case. Consequently, the amount of lubricant utilized is small. By disposing the motor gear 40 below the axis 108 of the shaft 110, the photovoltaic power-generating apparatus 200 can minimize the amount of lubricant utilized. Further, lubricant may be filled above the liquid level L, but is preferably below the axis 108.

When the motor gear 40 is disposed on the upper side of the shaft 110 (see FIG. 3), it is required to fill the enclosed space with lubricant for the purpose of supplying lubricant to the motor gear 40. Therefore, it is required to fill the interior of the gear transmission 10 with lubricant; further, it is required to fill the lubricant up to the position where the motor gear 40 is located. As shown in FIG. 9, the outer diameter of the motor gear 40 is smaller than the diameter of the shaft 110, i.e. it is smaller than the diameter of the output shaft of the gear transmission 10. Consequently, the volume of the space within the gear transmission 10 is greater than the volume of the space surrounding the motor gear 40. The photovoltaic power-generating apparatus 200 can minimize the amount of lubricant enclosed in a gear transmission 10 that has a large volume of space.

The amount of lubricant enclosed in the gear transmission 10 will be described. It is sufficient for lubricant, which must be supplied to the gears and bearings constituting the gear transmission 10, to be supplied to the part(s) (gear and/or bearing) that is/are positioned uppermost in the vertical direction. For example, the meshing of the external gear 18 and the internal gear 2 will be described. If a portion of the external teeth of the external gear 18 is immersed in the lubricant, each external tooth of the external gear 18 will be immersed in the lubricant as the external gear 18 rotates, even though the lubricant does not fill the entire enclosed space. That is, when the external gear 18 completes one revolution relative to the internal gear 2, lubricant will be applied to all the external teeth of the external gear 18. Consequently, even if all the external teeth of the external gear 18 do not constantly contact the lubricant, lubricant starvation (the state in which no oil layer is present between the external gear 18 and the internal gear 2) never occurs between the external gear 18 and the internal gear 2. In the photovoltaic power-generating apparatus 200, from the group of the gear 26, the gear 30, the gear 36, and the gear 40, the bearing 8 and the bearing 13, the tapered roller bearings 13 supporting the crankshaft 14 are positioned uppermost in the vertical direction. Consequently, only a portion of the tapered roller bearings 13 in the circumferential direction must be immersed in the lubricant.

Figure 11:
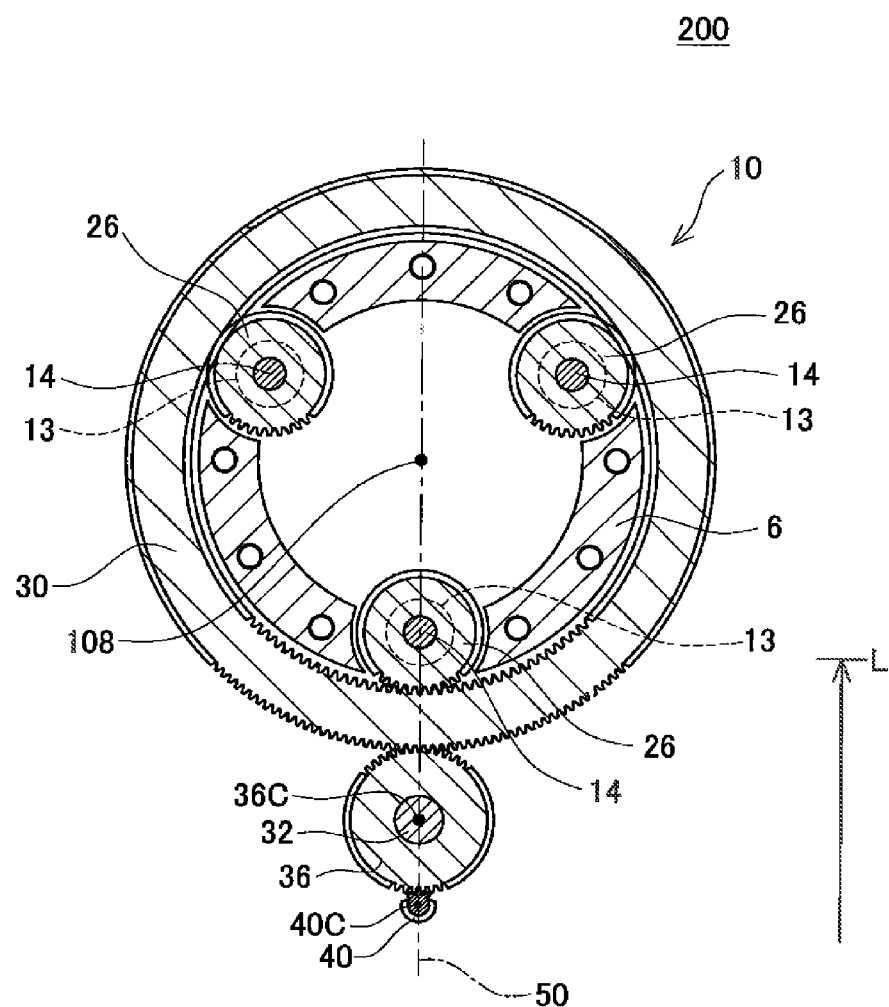
FIG. 11 shows a cross-sectional view along line XI-XI of FIG. 9.

FIG. 11 shows a cross-sectional view along line XI-XI of FIG. 9. Letter L indicates the height of the liquid level of the lubricant. As shown in FIG. 11, the gear transmission 10 comprises the three crankshafts 14; an input gear 26 is affixed to each crankshaft 14. In FIG. 11, a portion of one of the tapered roller bearings 13 in the circumferential direction is immersed in the lubricant; the other two tapered roller bearings 13 are not immersed in the lubricant. However, since the crankshafts 14 are supported on the carrier 6 (see FIG. 9), the crankshafts 14 move around the axis 108 following the rotation of the carrier 6. Consequently, if the height L of the liquid level of the lubricant is sufficiently high so as to contact a portion of one tapered roller bearing 13 at the lowest position, the other tapered roller bearings 13 will also eventually contact the lubricant when the carrier 6 rotates. In the photovoltaic power-generating apparatus 200, the enclosed space is required to be filled only to a height where it contacts a portion of the tapered roller bearing 13 in the circumferential direction that supports the lowermost crankshaft 14 in the vertical direction.

A preferred position of the motor 12 will be described with reference to FIG. 7. Furthermore, the preferred position of the motor 12 described below also applies to the position of the motor gear 40. Reference number 101 of FIG. 7 indicates the position of the sun when the sun is at its upper culmination. The motor 12 and the lubricant are heated the most when the sun 101 is at its upper culmination. Consequently, it is preferred that the motor 12 is positioned in the shadow of the main shaft 110. Therefore, it is preferred that the motor 12 is positioned, relative to the main shaft 110, on the opposite side from the sun 101. Broken line 103 of FIG. 7 indicates a plane that includes the axis 108 and is perpendicular to the sun 101. The extent of arrow A1 indicates the opposite side from the sun 101. Furthermore, as was described above, if the motor 12 is positioned lower than the axis 108 of the main shaft 110, the amount of lubricant utilized can be minimized. Consequently, the motor 12 is more preferably positioned within the extent of arrow A2. The further the motor gear 40 is positioned below the axis 108, the more the amount of lubricant utilized can be minimized. In the photovoltaic power-generating apparatus 200 of the present embodiment, the motor gear 40 is positioned vertically below the axis 108. Further, broken line 105 represents a horizontal line that includes the axis 108.

Further, the motor 12 is preferably positioned within the extent of arrow A3. The position of the sun 101 when the sun is at its upper culmination will vary according to the season and the region where the photovoltaic power-generating apparatus 200 is installed. Consequently, the extent of arrows A1, A2 will vary according to the season and region. However, if positioned within the extent of arrow A3, the motor 12 will be reliably positioned in the shadow of the main shaft 110 when the sun 101 is at its upper culmination. In the photovoltaic power-generating apparatus 200 of the present embodiment, the motor 12 is positioned within the extent of arrow A3. Further, broken line 107 represents a perpendicular line that includes the axis 108.

Other features of the photovoltaic power-generating apparatus 200 will now be described. As shown in FIGS. 7 and 10, the axis 108 that extends in the horizontal direction is in a "skewed position" with respect to the axis 114 that extends in the vertical direction. In other words, the axis 108 and the axis 114 are skew lines that are not parallel and do not intersect. Consequently, the motor 12 and the pivoting gear transmission 11 will not interfere despite the motor 12 being positioned vertically below the main shaft 110. As a result, the distance between the main shaft 110 and the pivoting gear transmission 11 in the direction of the axis 114 can be minimized. In other words, the distance between the gear transmission 10 and the pivoting gear transmission 11 in the vertical direction (the direction of the axis 114) can be minimized.

As was described above, by disposing the intermediate gear 36 between the ring gear 30 and the motor gear 40, the outer diameter of the ring gear 30 and/or the motor gear 40 can be minimized. Consequently, it is possible to minimize the volume of the space that houses the motor gear 40 and the amount of lubricant utilized. Further, as was described above, the motor 12 and the carrier 6 are positioned, relative to the intermediate gear 36, on one side in the direction of the axis 108. The intermediate gear 36 is supported on one end of the shaft 32 by deep groove ball bearings 34. As a result, because the distance between the motor 12 and the carrier 6 is close, the amount of lubricant utilized can be minimized.

In the above embodiments, the gear transmission 10 and the motor 12 are positioned such that their axes (the axis 108 and the axis 40C) are parallel. The gear transmission 10 and the motor 12 may be positioned such that the axis of the motor 12 intersects with the axis of the gear transmission 10. In that case as well, the motor 12 and the carrier 6 (or the crankshaft 14) may be positioned, relative to the intermediate gear 36, on one side of the axis 108. In order to realize this type of structure, each of the shaft 32 and the output shaft 42 of the motor 12 may be, e.g., affixed to a bevel gear and the bevel gears thereof may mesh.

In the above embodiments, as shown in FIGS. 4, 11, the center 108 of the ring gear 30, the center 36C of the intermediate gear 36 and the center 40C of the motor gear 40 are aligned on the same straight line 50. However, the positional relationship of the gears 30, 36 and 40 may be suitably chosen. After the positions of the motor gear 40 and the ring gear 30 have been determined, the intermediate gear 36 may be positioned such that it meshes with both gears 40, 30. Furthermore, the intermediate gear 36 is not required to be supported in a cantilevered manner, but may instead be supported on both sides.

In the above embodiments, the gear transmission 10 was described that eccentrically rotates the external gear 18 by rotating the crankshaft 14. The techniques taught in the present specification can also be applied to a gear transmission in which the internal gear is rotated eccentrically by rotating the crankshaft. In that case, the center of the internal gear may be offset in a radial direction from the axis of the gear transmission and the center of the external gear may be identical to the axis of the gear transmission. Further, a spur gear may be affixed to the crankshaft and rotate coaxially with the crankshaft. The internal teeth of the ring gear may mesh with the spur gear attached to the crankshaft. When the crankshaft rotates, the internal gear may rotate eccentrically and the external gear may rotate coaxially with the axis of the gear transmission.

In the above embodiments, the gear transmission 10 was described as an example utilized as a drive unit that rotates the panels 102 of the photovoltaic power-generating apparatuses 100, 200. Other parts can also be rotated using the gear transmissions 10, 200.

Further, in the above embodiments, a photovoltaic power-generating apparatus 100 was described in which a plurality of solar cells are provided on the surfaces 104 of the panels 102 and the panels 102 rotate so that their surfaces 104 face the sun. In the alternative, the gear transmission 10 may be suitably utilized in other types of photovoltaic power-generating apparatus. A power generating apparatus, in which a reflector is attached to the surface of the panel and collects the sunlight at one point to generate power, may be given as an example of another type of photovoltaic power-generating apparatus.

In the photovoltaic power-generating apparatus of the above embodiments, an eccentric oscillating-type gear transmission having a plurality of crankshafts was utilized. Consequently, the crankshafts are offset from the axis of the internal gear. However, the photovoltaic power-generating apparatus taught in the present specification may utilize various forms of gear transmissions. For example, an eccentric oscillating-type gear transmission may be utilized that has only one crankshaft positioned coaxially with the axis of the internal gear. Alternatively, the photovoltaic power-generating apparatus taught in the present specification may utilize a gear transmission comprising an elliptically rotating member, a flexible external gear that deforms around the rotating member to fit the shape of the rotating member, and an internal gear having a number of teeth differing from the number of teeth of the external gear and meshing with the external gear; this gear transmission decelerates by using the difference in the number of teeth of the external gear and the internal gear.

Moreover, the gear transmission used in the photovoltaic power-generating apparatus of the second embodiment may be a type having a planetary gear that moves around the axis of the carrier. As the carrier rotates, the planetary gear passes vertically below the axis of the carrier. At this time, the planetary gear is immersed in the lubricant. Alternatively, the gear transmission may be an eccentric oscillating-type, in which the internal gear and the external gear rotate relative to each another. Alternatively, the gear transmission may be a worm gear, a planetary gear mechanism, etc. In these cases as well, the motor gear attached to the output shaft of the motor may be positioned lower than the axis of the output shaft of the gear transmission. This photovoltaic power-generating apparatus does not require an amount of lubricant within the case of the gear transmission that is sufficient to immerse the entire carrier. This photovoltaic power-generating apparatus can minimize the amount of lubricant utilized.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification and drawings provide technical utility either independently or through various combinations. The present invention is not limited to the combinations described at the time the claims are filed. Further, the examples illustrated in the present specification or drawings may satisfy multiple objectives simultaneously, but satisfying any one objective, whether expressly mentioned or not, gives technical utility to the present invention.

The invention claimed is:

1. An eccentric oscillating-type gear transmission having an internal gear and an external gear meshing with the internal gear, in which one of the internal gear and the external gear rotates eccentrically relative to the other, the gear transmission comprising:

a crankshaft disposed alongside an axis of the gear transmission and being configured to eccentrically rotate one of the internal gear and the external gear;
a first gear attached at one end of the crankshaft;
a ring gear having internal teeth and external teeth, the internal teeth meshing with the first gear;
an intermediate gear meshing with the external teeth of the ring gear; and
a second gear attached at one end of an output shaft of a motor and meshing with the intermediate gear,
wherein a motor-body of the motor and the crankshaft are positioned, relative to the intermediate gear, on the same side in an axial direction of the gear transmission, and
an axial extension of the motor-body overlaps an axial extension of the crankshaft when viewed in a direction perpendicular to the axis of the gear transmission.

2. The gear transmission according to claim 1, wherein a shaft supports the intermediate gear, the shaft being supported in a cantilevered manner, relative the intermediate gear, on an opposite side from the motor.

3. The gear transmission according to claim 2, further comprising a carrier that supports the crankshaft, the carrier being supported coaxially on the other of the internal gear and the external gear, wherein
the first gear is positioned outwardly of the carrier in an axial direction of the carrier; and
the carrier and the motor are positioned, relative to the intermediate gear, on the same side in the axial direction of the gear transmission.

4. A photovoltaic power-generating apparatus comprising:
the gear transmission of claim 3,
a supporting column, to which the gear transmission of claim 3 is attached, such that an output shaft of the gear transmission extends in a horizontal direction; and
two panels positioned on opposite sides of the supporting column and attached to the output shaft of the gear transmission.

5. The photovoltaic power-generating apparatus according to claim 4, wherein
the carrier comprises a part of the output shaft of the gear transmission.

6. The photovoltaic power-generating apparatus according to claim 5, wherein
the second gear is positioned lower than an axis of the output shaft of the gear transmission.

7. The photovoltaic power-generating apparatus according to claim 6, wherein
a diameter of the output shaft of the gear transmission is larger than a diameter of the second gear.

8. The photovoltaic power-generating apparatus according to claim 7, wherein
the second gear is positioned, relative to the output shaft of the gear transmission, so as to be opposite of a sun when the sun is at its upper culmination.

9. The photovoltaic power-generating apparatus according to claim 7, wherein
the second gear is positioned vertically below the output shaft of the gear transmission.

10. The photovoltaic power-generating apparatus according to claim 9, wherein
an axis of the supporting column and the axis of the gear transmission are in a skewed positional relationship.

11. The gear transmission according to claim 3, wherein the axis of the gear transmission is parallel to a rotational axis of the output shaft of the motor.

12. The photovoltaic power-generating apparatus according to claim 4, wherein the second gear is positioned, relative to the output shaft of the gear transmission, so as to be opposite of a sun when the sun is at its upper culmination.

13. The photovoltaic power-generating apparatus according to claim 4, wherein
the second gear is positioned below the output shaft of the gear transmission in the vertical direction.

14. The photovoltaic power-generating apparatus according to claim 4, wherein
a vertical axis of the supporting column does not intersect and is not parallel to the axis of the gear transmission.

15. The gear transmission according to claim 1, further comprising a carrier that supports the crankshaft, the carrier being supported coaxially on the other of the internal gear and the external gear, wherein
the first gear is positioned outwardly of the carrier in an axial direction of the carrier; and
the carrier and the motor are positioned, relative to the intermediate gear, on the same side in the axial direction of the gear transmission.

16. A gear transmission comprising:
an internal gear;
an external gear meshing with the internal gear, wherein one of the internal gear and the external gear is eccentrically rotatable relative to the other,
a carrier configured to be rotatable about a rotational axis by rotation of the external gear,
at least one crankshaft configured to eccentrically rotate one of the internal gear and the external gear, the at least one crankshaft extending parallel to the rotational axis of the carrier;
a first gear attached at one end of the crankshaft;
a ring gear having internal teeth and external teeth, the internal teeth meshing with the first gear;
an intermediate gear meshing with the external teeth of the ring gear;
a motor having an output shaft; and
a second gear attached at one end of the output shaft of the motor and meshing with the intermediate gear,
wherein a motor-body of the motor and the crankshaft are positioned, relative to the intermediate gear, on the same side in the direction of the carrier rotational axis, and
an axial extension of the motor-body overlaps an axial extension of the crankshaft when viewed in a direction perpendicular to the axis of the gear transmission.

17. The gear transmission according to claim 16, wherein
the carrier rotatably supports the crankshaft;
the carrier is supported coaxially on one of the internal gear and the external gear;
the carrier has at least one output shaft extending therefrom;
the first gear is positioned axially outward of the carrier;
the carrier and the motor-body are positioned, relative to the intermediate gear, on the same side in the direction of the carrier rotational axis;
the carrier rotational axis is parallel to a rotational axis of the output shaft of the motor-body;
an axial extension of the motor-body overlaps an axial extension of the crankshaft when viewed in a direction perpendicular to the axis of the gear transmission; and
the carrier has a diameter that is larger than a diameter of the second gear.

18. A photovoltaic power-generating apparatus comprising:
a vertically-extending supporting column having the gear transmission of claim 17 attached thereto such that the at least one output shaft of the carrier extends in a horizontal direction; and
two panels positioned on opposite sides of the supporting column and attached to the at least one output shaft of the carrier, each panel being configured to support a plurality of solar cells.

19. The photovoltaic power-generating apparatus according to claim 18, wherein
the second gear is positioned below the at least output shaft of the carrier in the vertical direction; and
a central vertical axis of the supporting column does not intersect and is not parallel to the carrier rotational axis.

* * * * *